ESAKI DIODE MEMORY

Filed March 16, 1961 3 Sheets-Sheet 1

INVENTORS
ROBERT A. HENLE
WILLIAM W. LAWRENCE JR.
J B. PACE
HERMANN P. WOLFF

BY Wesley De Bruin
ATTORNEY

ESAKI DIODE MEMORY

Filed March 16, 1961

3,134,963

ESAKI DIODE MEMORY

Robert A. Henle, Hyde Park, William W. Lawrence, Jr., Poughkeepsie, J B. Pace, Hopewell Junction, and Hermann P. Wolff, Poughkeepsie, N.Y., assignors to International Business Machines Corporation, New York, N.Y., a corporation of New York Filed Mar. 16, 1961, Ser. No. 96,319
1 Claim. (Cl. 340—173)

This invention relates to information storage apparatus, and more particularly to memory systems for digital computer apparatus utilizing negative resistance elements.

An essential component of a digital computing organization is its information storage, or memory apparatus. Here, data may be retained and operated on when required by the problem at hand. Here, also, the program, or sequence of instructions controlling the computer, may be stored. Every program step executed by the computer may then require one or more "trips" to the storage apparatus to obtain the necessary data and instructions. It will be realized that the time required to request and transfer data and instructions from the storage apparatus to the arithmetic and logic portion of the computer is a considerable proportion of the total solution time. Decreasing this storage access time is a constant goal of computer designers.

The most widely used type of computer memory employs minute toroidal cores of a magnetic material having a rectangular hysteresis loop. These cores act as the storage devices for the individual "bits" of information. The rectangular hysteresis characteristic permits the core to remain in either of two stable conditions, corresponding to the "0" and "1" indications of the binary system used in the computer. By suitable application of positive and negative signal pulses, the individual cores may be selectively switched between these two states. The cores are arranged in a plurality of two dimensional matrices or planes, which may then be stacked to provide a three dimensional array. This latter arrangement is generally used since it provides a maximum of storage capacity in a minimum of space and requires a minimum number of signal generators to perform the necessary writing (storing) and reading (sensing) of data.

A memory system of this type is described in U.S. Patent No. 2,960,683, to Gregory et al., and reference may be had thereto for a detailed description of such a system.

Although the magnetic core provides an extremely reliable and inexpensive memory element, it presents several short-comings which are of increasing importance as computer technology advances. Notable among these are its slow switching speed relative to the switching speed of present day logical circuitry. Its size and power dissipation also present problems in view of the micro-miniaturization techniques being successfully applied to other circuitry in the computer. Although much progress has been made in the design of the magnetic core to alleviate these problems, the magnetic core memory remains unsuitable for the higher speed, more sophisticated computer machines of the future.

A device has recently come into prominence which possesses the requisite bistable characteristic to enable its usage as the binary storage element in a memory system. This device is variously known as the tunnel diode.

Briefly, this device is a semiconductor diode having a negative resistance characteristic in its forward conducting direction which can be switched through its negative resistance region in fractions of a nano-second by low level signals. Proper biasing of the device provides two stable operating points, one on either side of the negative resistance region. In addition to its rapid switching, this device is notable for its minute size, low power dissipation, and stability under varying environmental conditions. All of these characteristics naturally suggested its use as a memory element; however, the low operating voltage and current levels of the device have heretofore presented serious sensing problems.

Accordingly, it is the primary object of this invention to provide an improved memory system.

A further object of this invention is to provide an improved memory system utilizing tunnel diodes as the storage elements thereof.

Another object of this invention is to provide an improved storage cell for both two and three dimensional memory systems utilizing a tunnel diode.

Still another object of this invention is to provide an improved read-out or sensing system for a memory array employing tunnel diodes.

In accordance with the present invention, each storage cell of the memory matrix comprises a tunnel diode having one terminal connected to a reference level and a plurality of voltage sources connected to the other terminal. The diode is normally biased to provide a bistable operating characteristic. Sensing means are provided in the connection between reference potential and the diode, this latter means being responsive to a current change to indicate the stored information. Information is written or read by suitable combinations of positive and negative pulses applied to the diode. In the array, predetermined groups of diodes are connected in common to a reference potential, so that a single sensing means may be provided for a large number of diodes.

The foregoing and other objects, features and advantages of the invention will be apparent from the following more particular description of preferred embodiments of the invention, as illustrated in the accompanying drawings.

In the drawings:

FIG. 1 is a circuit representation of one embodiment of the basic storage cell of the present invention;

FIGS. 2*a* and 2*b* illustrate input waveforms for the circuit of FIG. 1;

FIG. 3 is a characteristic curve useful in explaining the operation of the circuit of FIG. 1;

FIGS. 4*a* and 4*b* are curves illustrating the sensing operation used in the present invention;

Figures 1, 2A, 2B, 3, 4A, 4B:
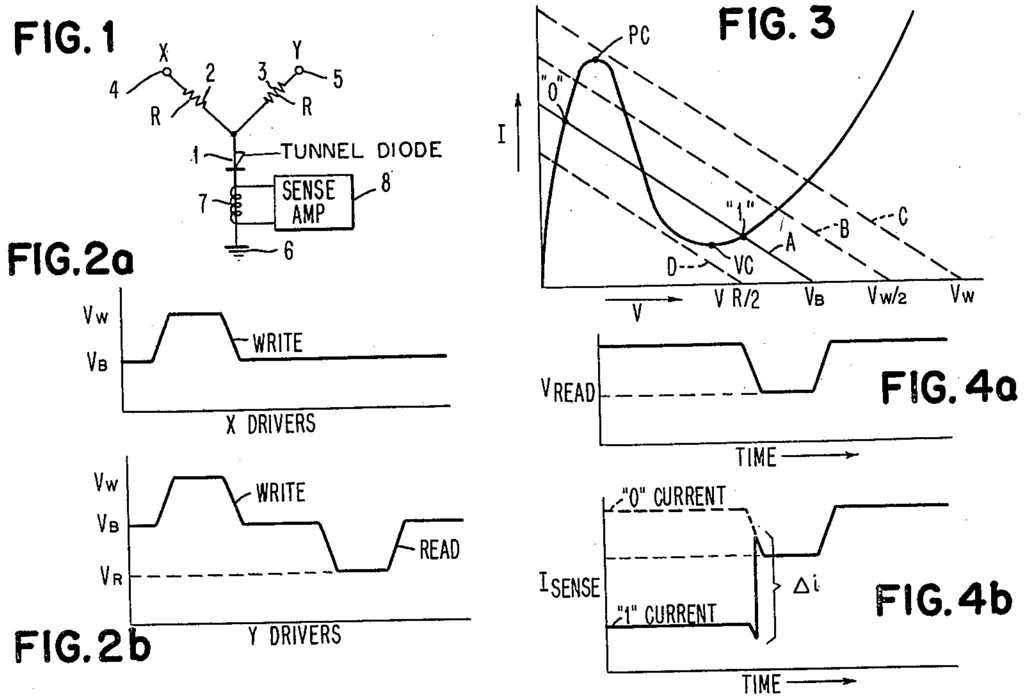

Referring now more particularly to FIG. 1, there is shown one embodiment of the basic storage cell of the present invention. This circuit comprises a tunnel or Esaki diode 1 having its cathode terminal coupled to reference potential, for example, ground 6. The anode terminal of diode 1 is connected to one terminal of each of impedance elements 2 and 3, shown as resistors having equal resistance R. The other terminals of impedance elements 2, 3 are coupled to input terminals 4 and 5, respectively. The X and Y input signals shown in FIGS. 2*a* and 2*b* are applied to the input terminals 4 and 5, respectively.

A sense amplifier 8 is coupled via a network presenting low impedance, such as pick up coil 7, to the conductor coupling the cathode of diode 1 to ground. This amplifier may be of any well known type sensitive to current changes in the conductor to which it is coupled.

As shown in FIGS. 2*a* and 2*b*, these input signals are in the form of pulses superimposed upon a threshold voltage level indicated as $V_B$. The X driver waveform of FIG. 2*a* consists of a single write pulse having a voltage $V_W$ positive with respect to the threshold voltage. The Y driver pulses of FIG. 2*b* include a similar write pulse and in addition, a negative read pulse having a voltage level $V_R$ negative with respect to the threshold level $V_B$. As will become apparent from the discussion of FIG. 3 to follow, the writing or storing of a signal in the storage cell requires the simultaneous application of write pulses at the X and Y terminals of the cell. The read operation, however, requires the application of a negative read pulse on only one of these input terminals, in this case the Y terminal.

In FIG. 3 is illustrated the current vs. voltage characteristic of the tunnel diode 1. For present purposes, it is believed sufficient to note that because of phenomena associated with quantum mechanic tunneling, a diode composed of semiconductor material having predetermined impurity levels will exhibit a negative resistance region in its forward conducting direction. This region is shown in FIG. 3 as lying between what is termed the "peak current" point, PC, and the "valley current" point, VC. Positive resistance regions lie on either side of the negative resistance region. For a more detailed discussion of the physics involved, reference may be had to an article by Leo Esaki appearing in the Physical Review for January 15, 1958, entitled: "New Phenomenon in Narrow Germanium PN Junctions."

The values of the threshold voltage $V_B$ of the X and Y input signals and the magnitude of their resistances 2 and 3 are chosen to provide a bistable load line A for the diode 1. This load line intersects the low and high voltage positive resistance regions of the diode characteristic as well as the negative resistance region thereof. It is evident that the operating point of the diode never remains in the negative resistance region but seeks either of the two stable points in the positive resistance regions. As is apparent from the circuit, the slope of this load line is equal to $2/R$. It has been convenient to select the low voltage stable point of the diode operation as being indicative of the binary "0" and the high voltage stable point as the binary "1."

Assuming that the diode is resting in its low voltage stable point, a positive write pulse applied to either the X or Y input terminals will tend to shift the load line parallel to itself and towards the peak current point PC. The magnitude of the write pulse voltage is selected to be insufficient to cause the load line to go beyond the peak current point. Therefore, upon cessation of the single write pulse, the operating point of the diode reverts back to its "0" position. Simultaneous application of write pulses to the X and Y terminals, however, causes the load line to move out to position C, thereby going beyond the peak current point of the diode characteristic. The diode now switches to its high voltage operating region, and upon cessation of the write pulses, resumes quiescent operation at its high voltage stable point, indicating that a binary "1" has now been stored in the device. The diode will remain in this position until it is read.

Sensing or reading of the diode is accomplished by application of a negative pulse to the Y input. The load line A is selected so that only a single negative read pulse is required to perform the switching operation. Thus, upon application of the read pulse, the load line is moved out and down to position D and operation of the diode reverts to its low voltage condition. Upon cessation of the read pulse, the diode resumes operation at its "0" position.

In FIGS. 4*a* and 4*b* are illustrated voltage and current waveforms illustrating the reading or sensing operation of the storage cell. The negative pulse of FIG. 4*a* is the same as the read pulse of FIG. 2*b*. The current waveform of FIG. 4*b* is arranged on the same time scale as the read pulse. Assuming first that the memory cell is initially in its "0" state, the current through the diode 1 and thus through the coupling coil 7 of the sense amplifier 8, is in the higher of the two stable values. This is illustrated by the dotted line labeled "0" current of FIG. 4*b*. A read pulse supplied to the diode now serves to move the operating point of the device from its "0" point down along its low voltage characteristic to its intersection with the displaced load line D. This results in a relatively small decrease of the current through the diode. The current remains at this level for the duration of the read pulse and upon the conclusion thereof, returns to its "0" current level. Therefore, a read pulse applied to a diode in its "0" state produces a relatively small negative current displacement through the diode.

With the diode storing a binary "1," the current through the device is initially at its lower stable level, indicated as the "1" current in FIG. 4*b*. Now, application of a read pulse to the diode initially moves the current down along the curve to the valley point VC, from which point it rapidly switches to the high current (low voltage) region of the characteristic curve. This action is illustrated by the substantially vertical current increase, $\Delta i$, of FIG. 4*b*. As will be seen from the waveforms, the switching of the operating point from VC to the low voltage portion of the characteristic is extremely rapid with respect to the fall time of the read pulse. Thus, immediately after the switching, the operating point intersects the low voltage portion of the characteristic at a point intermediate the initial "0" point and that formed by the intersection of the curve with the temporary load line D. The current then drops to the latter point, remains there for the duration of the read pulse, and then returns to the "0" current level. As discussed hereinabove, the sense amplifier 8 is sensitive to this large current rise $\Delta i$, to indicate that a "1" had been stored in the memory cell.

Figure 5:
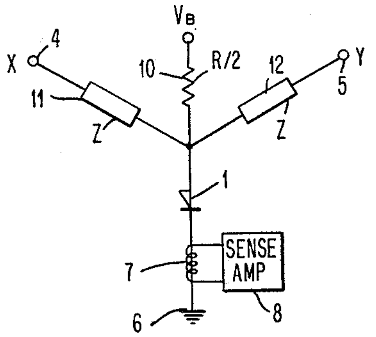
FIG. 5 is another embodiment of the basic storage cell of the present invention.

FIG. 5 illustrates an alternate embodiment of the basic storage cell of FIG. 1. It is generally similar to that of FIG. 1 and the same reference numerals are used to denote similar elements. As shown, the cell comprises a tunnel diode 1 having its cathode terminal coupled to ground 6 through the pickup coil 7 of the sense amplifier 8. The anode terminal of the diode 1 is connected through bias resistor 10 to a bias voltage source $V_B$. This bias resistor has a value equal to $R/2$, R being equal to the R of the resistors 2 and 3 of FIG. 1. It will be seen that the bias voltage $V_B$, together with the resistor 10 having a value $R/2$, will provide the quiescent load line A of FIG. 3 for this memory cell. The X and Y input terminals, 4 and 5 respectively, are also coupled to the anode terminal of the diode 1 through respective impedances 11 and 12. These impedances may be capacitors, resistors, etc. The arrangement of FIG. 5 simplifies the biasing problems of the invention and permits A.C. coupling to be used between the drivers and the memory cell. It will be appreciated, however, that operation of the diode 1 of FIG. 5 is identical to that of the diode 1 of FIG. 1 and the curves of FIGS. 2*a*, 2*b*, 3, 4*a* and 4*b* apply similarly thereto.

Figure 6:
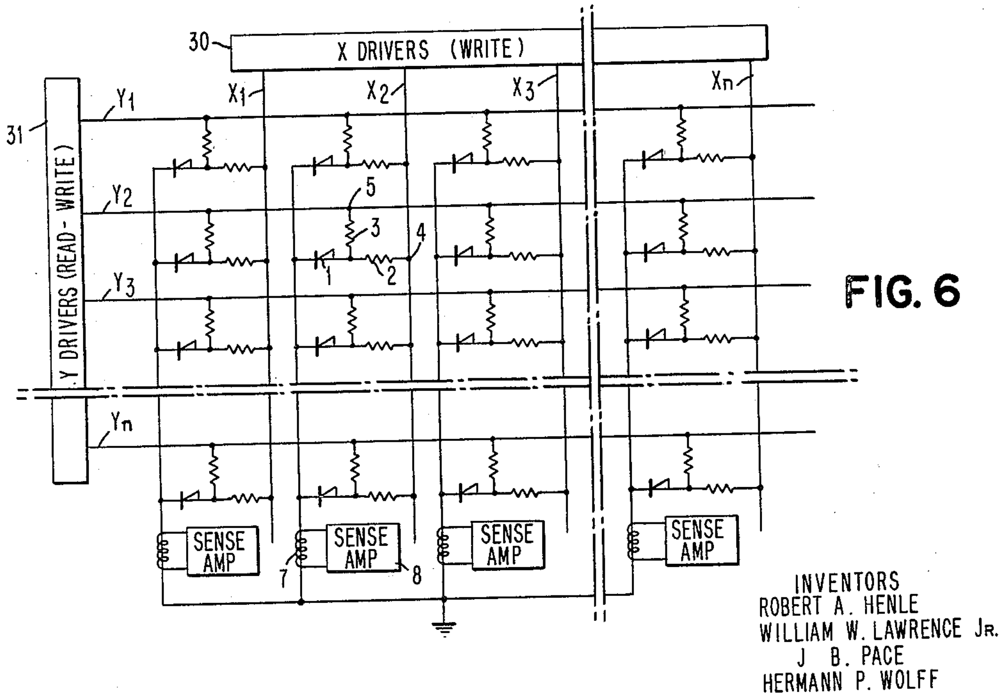
FIG. 6 is a two dimensional memory matrix utilizing the basic storage cell of the present invention.

A two-dimensional memory matrix, using the basic storage cell of the present invention, is illustrated in FIG. 6. This matrix comprises a plurality of basic storage cells according to the present invention arranged in series of columns and rows. The specific embodiment shown utilizes the structure of FIG. 1, although the arrangement of FIG. 5 could be used as well. Element 30 denotes a plurality of X driver circuits for providing the signals shown in FIG. 2*a*. The X drivers are coupled through lines $X_1, X_2, X_3, \ldots X_N$, to the input terminals 4 of each of the memory cells of the matrix. It should be understood that each of the X lines provides the signal such as shown in FIG. 2*a* upon actuation of its respective driver. Similarly, the Y drivers 31 provide on lines $Y_1, Y_2, Y_3, \ldots Y_N$, the write and read signals illustrated in FIG. 2*b*. These signals are coupled to the input terminal 5 of each of the memory cells. The cathode terminals of all of the tunnel diodes in a single column of the matrix are connected in parallel and through the pickup coil 7 of the sense amplifier 8 to ground. As illustrated, each of the columns has its own sense amplifier. To write or store a "1" in any selected cell of the matrix, it is necessary that the X and Y drivers be simultaneously actuated to provide write signals to the input terminals of the selected cell. For example, if a write pulse is provided on line $X_2$ by the X driver and a similar write pulse provided on line $Y_2$ by the Y driver, then the diode 1 is switched from its "0" state to its "1" state in accordance with the discussion of FIG. 3. Although each of the other cells coupled to the line $X_2$ has a write driver pulse applied to one input terminal thereof, the single input is insufficient to switch the respective diodes. Likewise, the other diodes in the row coupled to line $Y_2$ have write signals applied at their inputs which are insufficient of themselves to switch the respective diodes. Only the diode at the intersection of the $X_2$, $Y_2$ lines has the requisite pair of write signals applied thereto.

Sensing or reading of the two-dimensional matrix is accomplished an entire row at a time. If a read pulse is provided on line $Y_2$ by the driver 31, all of the diodes coupled thereto, that are in the "1" state, are switched to the "0" state as discussed hereinabove. This provides the positive current change $\Delta i$ at the output of the diode which is sensed by the respective sense amplifiers 8. As will be readily appreciated, only a single diode in each column is switched by the read pulse on $Y_2$, and thus the sense amplifiers 8 read only the contents of that row of memory cells. This arrangement, of course, imposes the restriction on the system that only one row be read at any given time.

Although the X and Y drivers 30 and 31, respectively, have been illustrated merely in block form, it will be appreciated that any suitable pulse generating arrangement may be used to provide the requisite switching signals. These elements may conveniently comprise banks of amplifiers to which are applied signals generated by the logical circuitry of the computer. Thus, an instruction in the computer to read a particular memory cell will generate an appropriate pulse which will be amplified by the Y drivers and directed to the chosen memory cell. Any type of well known circuitry may be used for this operation and a detailed showing thereof is believed unnecessary.

Figure 7:
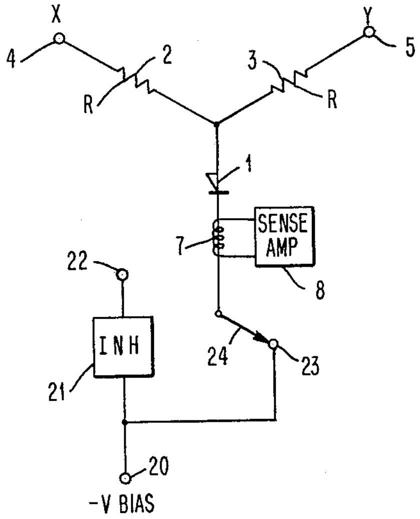
FIG. 7 is a modification of the circuit of FIG. 1 for use in a three dimensional memory array.

It was noted above that the basic memory cell of the present invention is applicable to three-dimensional as well as two-dimensional memory systems. In FIG. 7 is illustrated the basic memory cell modified for three-dimensional operation. As is evident therefrom, the circuit is substantially the same as that of FIG. 1 and similar elements thereof have the same reference numerals. It should also be understood, that the basic configuration of FIG. 5 may be used in the modification of FIG. 7 as well. As shown in the latter figure, the modification necessary to adapt the basic cell to three-dimensional operation requires operative connections intermediate the cathode terminal of the diode 1 and reference potential. These modifications include a switch of the single pole double throw type, indicated diagrammatically as having a pair of terminals 22, 23 and a switch arm 24. It will be realized, of course, that in actual practice a mechanical switch of this type will not be used. Preferably, electronic switching such as a suitable transistor circuit, would be used for this purpose. The present representation, however, is believed sufficient for explanatory purposes. Terminal 23 is coupled via a conductor to reference terminal 20 which is coupled to a negative bias source. This bias source is equal in magnitude to the $V_B$ of FIGS. 1 and 5 to provide the desired quiescent load line. This negative bias at the cathode terminal of the diode 1 of FIG. 7 is, of course, equivalent to the positive bias on the anode terminal of FIGS. 1 and 5.

The other terminal of the switch 22 is coupled through an inhibit pulse source 21 to the bias terminal 20. This inhibit pulse source upon actuation provides a pulse of the same type as the X or Y write drivers.

Figure 8:
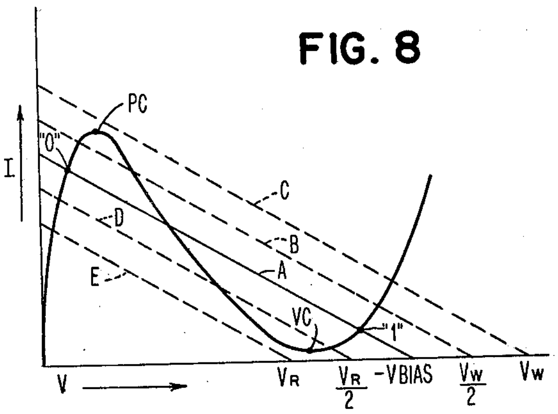
FIG. 8 is a characteristic curve useful in explaining the operation of the circuit of FIG. 7.
Figure 9:
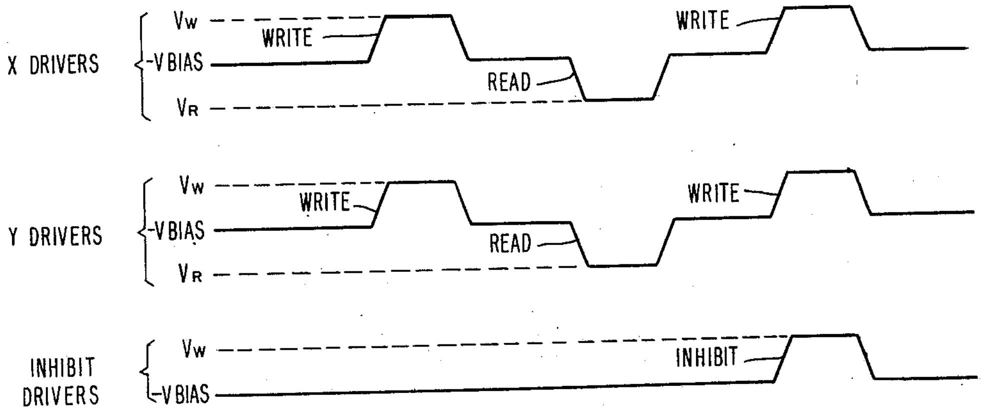
FIG. 9 illustrates input waveforms for the circuit of FIG. 7.

FIG. 8 shows the diode characteristic curve similar to that of FIG. 3 for explaining the three-dimensional operation of the individual memory cell. With switch arm 24 coupled to terminal 23, the quiescent load line A for the diode 1 is established. To switch the diode from its "0" state to its "1" state, coincident write pulses must be applied to the X and Y input terminals, 4 and 5 respectively. These pulses are shown in FIG. 9. In the same way as discussed with respect to FIG. 3, a single write pulse input to the memory cell will move the load line out to position B, insufficient to switch the diode. Simultaneous pulses at both the X and Y inputs will, however, move the load line out to position C which will be effective to switch the diode to its high voltage operating state. Operation of the three-dimensional memory cell is thus far identical to that of the two-dimensional cell.

The read procedure for the three-dimensional cell is somewhat different from that of the two-dimensional cell. As will become apparent in the discussion of the three-dimensional matrix of FIG. 10, a single read pulse may not be used in the three-dimensional scheme. Operation of the diode is modified to require a pair of simultaneous read pulses at the X and Y lines to cause the switching of a diode from its "1" back to its "0" state. Referring back to FIG. 8, the operating characteristics of the diode are selected so that a single read pulse on either the X or Y inputs to the cell will displace the load line to position D, insufficient to switch the diode back to its "0" state. However, simultaneous application of read pulses at both X and Y inputs will move the load line out to position E which will result in switching of the diode. Although two read pulses are now required to switch the diode back to its "0" condition, the curve of FIG. 4*b* is applicable to the three-dimensional configuration and switching of the diode will cause the large positive current change, $\Delta i$, illustrated therein. This current change is sensed by the amplifier 8 to indicate that a "1" had been stored in the cell. The simultaneous read pulses at the X and Y drivers are illustrated in FIG. 9

It is thus apparent that with the switch at terminal 23, operation of the memory cell is substantially the same as that of the two-dimensional cells. Except for the pair of read pulses required, the operation is identical. However, for reasons which will become apparent in the discussion of FIG. 10 to follow, it is necessary at times to render the diode 1 of any given memory cell of a three-dimensional matrix insensitive to simultaneous application of write pulses to the X and Y inputs thereof. To achieve this operation, the inhibit pulse source 21 is provided. Referring to the waveforms of FIG. 9, and the characteristics of FIG. 8, it will be seen that a pair of positive write pulses at the X and Y inputs of a cell will cause that cell to switch from a "0" to a "1" condition. The inhibit pulse source 21 provides a positive pulse to the cathode terminal of diode 1 which, when combined with a pair of positive pulses applied to the X and Y inputs at the anode terminals of the diode, results in a net voltage change across the diode equal to half of the necessary write voltage. Thus, application of an output from driver 21, when simultaneous write inputs are applied to the X and Y inputs, may be said to inhibit writing into the specific memory cell. This situation is illustrated at the right-hand portion of the waveforms of FIG. 9.

Figure 10:
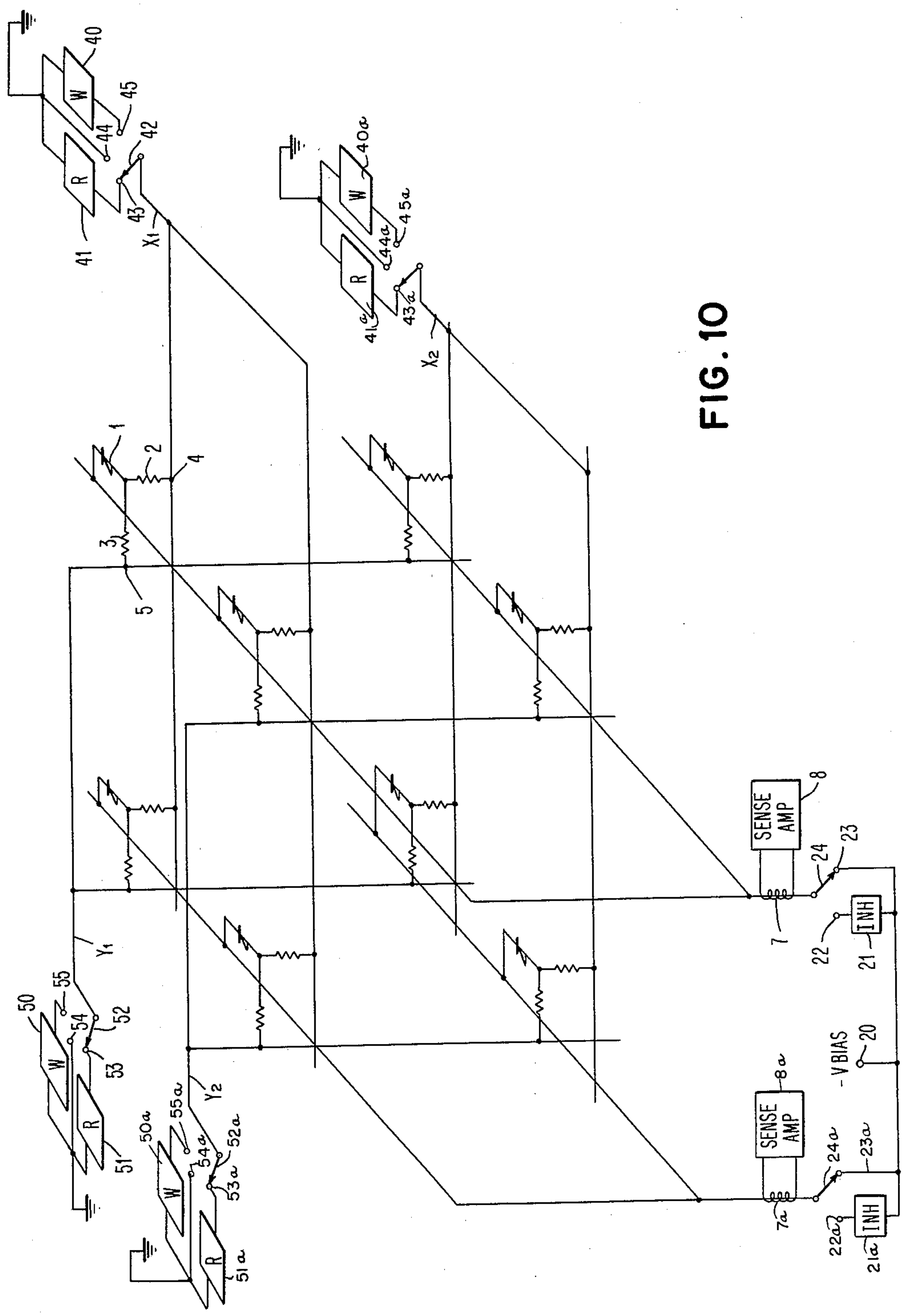
FIG. 10 illustrates a three dimensional memory array utilizing the principles of the present invention.

A 2 *x* 2 *x* 2 three-dimensional memory matrix is illustrated in FIG. 10. This matrix comprises 8 separate storage cells such as that of FIG. 7 with the required drivers and bias voltage source. For purposes of explanation, the X and Y drivers for this matrix have been individually illustrated. Thus, the $X_1$ driver arrangement comprises a write pulse source 40, and a read pulse source 41. A three-position switch couples the $X_1$ input line through arm 42 selectively to terminal 43 coupled to the read driver 41, terminal 44 coupled directly to reference potential, and terminal 45 connected to the write driver 40. This switch arm 42 completes a connection from its terminal over the $X_1$ line to the input terminals 4 of the four memory cells lying in the horizontal upper plane of the matrix. A similar drive arrangement (shown with the letter *a* added to the reference characters for the elements of the arrangement) couples the line $X_2$ to the four memory cells lying in the lower horizontal plane of the matrix. In like manner, the Y drivers comprise a write pulse source 50 and a read pulse source 51. The switch arm 52 is selectively connected through terminal 53 to the read pulse source 51, the terminal 54 to ground, or the terminal 55 to the write pulse source 50. This switch couples its respective terminal to the $Y_1$ line which is coupled, in turn, to the input terminal 5 of each of the four memory ceells lying in the rearward vertical plane of the drawing. A similar drive arrangement (shown with the letter *a* added to the reference characters for the elements of the arrangement) is coupled to the input line $Y_2$ which is coupled, in turn, to the input terminals 5 of the memory cells lying in the forward vertical plane of the matrix. The cathode terminals of the diodes of each of the four memory cells lying in the right-hand vertical plane of the matrix are coupled in parallel through the numbered pickup coil 7 of sense amplifier 8 and thence through switch arrangement 22, 23 24 to the negative bias source 20 or inhibit source 21. The diodes lying in the left-hand vertical plane of the matrix are coupled through a similar arrangement (shown with the letter *a* added to the reference characters of the elements of the switch arrangement) to the V bias source 20.

In quiescent condition, all of the switch arms **42, 42*a*, 52, and 52*a*, are coupled to terminals 44, 44*a*, 54, and 54*a*, respectively, and thus to ground. Switch arms 24 and 24*a* are also coupled at this time to contacts 23 and 23*a*, respectively, and thence to the negative bias source 20. It will thus be apparent that each of the diodes has a voltage impressed across it equal to the —V bias and the device has a load line shown at A in FIG. 8. Assuming the diode to be initially in its "0" state, to switch, for example, the rear upper right-hand diode of the matrix to its "1" condition, is necessary only to connect the driver 40 to the $X_1$ line via switch arm 42 and terminal 45, and the Y driver 50 to line $Y_1$ via switch arm 52 and terminal 55. These connections provide suitable write pulses at the input terminals 4 and 5 of the selected diode. It will be apparent that this connection also provides write pulses at input terminals of other of the diodes of the matrix. However, the diode of the rear upper left-hand cell is the only other diode having the simultaneous application of both X and Y input signals thereto. As described above for FIGS. 7–9, switching of this cell may be prevented by connecting the cathode of this diode through the inhibit driver 20*a* to the —V bias source at 20. At the conclusion of the switching operation, the switch arms 42, 52 are returned to the terminals 44, 54, respectively, and the switch arm 24*a* is returned to the contact 23*a***. The selected diode is now resting at its "1" condition.

Sensing or reading of a particular memory cell may be effected in a similar manner. Thus, to read the cell previously written, the switch arm 42 is moved into contact with terminal 43 to provide a read pulse on line $X_1$ and simultaneously therewith switch arm 52 is connected to terminal 53 to provide a read pulse from source 51 on line $Y_1$. This provides the requisite negative read pulses at the input terminals 4 and 5 of the selected cell and the operation of the diode thereof is returned to its "0" position. As in the write case discussed above, read pulses are also applied to other input terminals of other cells of the matrix. However, the diode of the rear upper left-hand cell is the only other diode having the simultaneous application of both X and Y input signals thereto. As stated below, the condition of this diode may also be sensed by its respective sense amplifier.

The contents of the selected cell are sensed in the same manner as discussed with respect to the individual memory cell of FIG. 7. The cathode of the switched diode is coupled through the pickup coil 7 of an associated amplifier 8 and the positive current step resulting from its switching from "1" to "0" states is indicated thereby. As in the case of the two-dimensional matrix, an entire row of memory cells may be read out simultaneously. Thus, application of read pulses to line $Y_1$ and $X_1$ switches all of the cells connected thereto and each of the sense amplifiers 8 indicates the condition of its respective diodes. This operation imposes a restriction that only one X driver and only one Y driver be actuated simultaneously. The necessity for a pair of read pulses, as discussed in FIG 8, as opposed to the single read pulse of the two-dimensional matrix, is also apparent from this mode of operation. For example, if a single Y read pulse was sufficient to switch the connected memory cells, in the three-dimensional configuration, all of the cells in the rearward vertical plane of the matrix would be switched simultaneously. Since the two left-hand cells in this plane are connected to a common sense amplifier and the two right-hand cells connected to a common sense amplifier, it would be impossible with this sensing scheme to determine which of the two cells in the line actually was switched, and the output would be meaningless. This ambiguity could be obviated, of course, by providing a separate sense amplifier for each cell of the matrix, but as will be appreciated, this would require a prohibitive amount of apparatus to perform the sensing operation which not only would make the cost of the memory extremely high, but would require a large amount of space. Accordingly, the selection arrangement discussed above is the most practical for use.

The sensing or read out of the memory cell of the present invention is what is termed destructive in nature. That is, after the reading operation of a cell originally in its "1" state, the cell is returned to a "0" state. It is frequently desirable in computer applications that the contents of the memory not be removed after each additional operation. In some instances, this result can be achieved by the use of non-destructive readout elements which do not lose their information content during the readout cycle. In the case of destructively read elements, such as of the present invention, it is necessary to restore or regenerate the information read out of the cell. This may be accomplished by writing the information back into the cells which have been read, immediately after the termination of the read cycle. The inhibit sources 21 and **21*a* of FIGS. 7 and 10 are provided to assist in this function. Let us assume that the rear upper right-hand cell of the matrix of FIG. 10 had been read and that a "1" had been sensed as being stored therein. The reading operation thus resulted in the cell being switched from its "1" to its "0" state. Also let us assume that the rear upper left-hand cell of the matrix, which is also coupled to the $Y_1$ line, had a "0" stored therein during the read operation. It is now desired to restore or regenerate the information that was read out of the rear upper right-hand cell. To accomplish this, the switch arm 42 is coupled to terminal 45 and the arm 52 to terminal 55 to connect the respective write pulse sources 40 and 50 to the desired cell. This, it will be apparent, achieves the function of switching the diode 1 back to its "1" condition. It also, however, would normally have the effect of switching the rear upper left-hand cell of the matrix to its "1" position. But, as noted above, this cell has a "0" stored in it and to switch it to its "1" position would be to change its information content and thus generate an error. To prevent this, the inhibit driver 21*a* is connected to the cathode of its diode by movement of its switch arm 24*a*** to the terminal 22*a*. Referring to FIG. 9, application of simultaneous write pulses to the X and Y inputs of the cell will have its effect counteracted by the simultaneous inhibit pulse applied thereto. Thus, the regeneration cycle has switched the upper right-hand cell back to its original "1" condition and has left the left-hand cell in its original "0" condition. The inhibit pulse source then permits proper regeneration or restoration of information in the memory matrix.

While all of the switching mechanisms in the above-described circuitry have been illustrated schematically, it will be realized that in actual practice electronic switching means such as transistors, would be used in place thereof. It is believed sufficient, however, for an understanding of the operation of the present invention, that the switches be illustrated in their present form.

While the invention has been particularly shown and described with reference to preferred embodiments thereof, it will be understood by those skilled in the art that various changes in form and details may be made therein without departing from the spirit and scope of the invention.

What is claimed is:

A three dimensional memory array for storing a plurality of bits of information codified as a binary "1" or a binary "0" indicative of the state of information stored, comprising a plurality of memory planes, each plane including a plurality of rows and columns intersecting in matrical manner to form a plurality of cross points, a storage cell located at each cross point, a plurality of conductors interconnecting similarly positioned storage cells in each plane, each of the storage cells including a tunnel diode, a first resistor for connecting the anode of the diode to its respective row, and a second resistor for connecting the anode of the diode to its respective column, biasing, inhibiting and sensing means commonly connected by respective ones of said conductors to the cathodes of the diodes of the storage cells similarly positioned in each plane, said biasing means being operative to establish the normal operating state on the volt-ampere characteristic of the diodes, the characteristic of the diodes having a low voltage positive resistance region defining said binary "0" state and a high voltage positive resistance region defining said binary "1" state, and a plurality of pulse sources, each including a read driver circuit and a write driver circuit coupled to the cells connected to all the rows in respective orthogonal row planes and connected to all the columns in respective orthogonal column planes, so that the first resistor of each cell is connected to a pulse source for an orthogonal plane of rows and the second resistor of each cell is connected to a pulse source for an orthogonal plane of columns, whereby the cells common to both of the intersecting orthogonal planes may be discretely selected to change state by coincidence of pulses from like row and column driver circuits, coincidence of pulses from respective write driver circuits varying the current flow of the devices of selected cells to switch the devices from the binary "0" state to the binary "1" state and coincidence of pulses from respective read driver circuits varying the current flow of the devices of selected cells to switch the devices from the binary "1" state to the binary "0" state, said inhibiting means being selectively activated by supplying pulses to designated ones of the selected cells during a write operation to prevent switching of the designated cells, the inhibiting pulses being of the same polarity as those supplied by the driver circuits, said sensing means including inductive elements series connected by said conductors to said diodes for being responsive to the variation in current flow occurring in a diode when changing state so as to produce a signal indicative thereof, said sensing means being characterized by detecting the level of current flow of a switched diode without any attenuation in the detected signal.

References Cited in the file of this patent

UNITED STATES PATENTS

| | | |
|---|---|---|
| 2,736,880 | Forrester | Feb. 28, 1956 |
| 3,017,613 | Miller | Jan. 16, 1962 |

OTHER REFERENCES

Basic Electricity, Navy Training Courses, Navpers 10086, published by Government Printing Office, 1956 (pp. 249–250 relied on).

1960 I.R.E. International Convention Record, Part 2, pp. 114–123, Mar. 21–24, 1960, by M. M. Kaufman.